United States Patent [19]
Sohda et al.

[11] Patent Number: 6,056,912
[45] Date of Patent: May 2, 2000

[54] PROCESS FOR PRODUCING CARBON-FIBER-REINFORCED COMPOSITE MATERIAL

[75] Inventors: Yoshio Sohda; Takefumi Kohno; Masaaki Shinagawa, all of Yokohama, Japan

[73] Assignee: Nippon Oil Co., Ltd., Tokyo, Japan

[21] Appl. No.: 09/055,226

[22] Filed: Apr. 6, 1998

[30] Foreign Application Priority Data

Apr. 7, 1997 [JP] Japan .................................... 9-102448

[51] Int. Cl.[7] ..................................................... H05B 6/00
[52] U.S. Cl. ...................... 264/478; 264/279; 264/328.1; 264/331.12; 264/331.21; 29/527.1; 29/527.2
[58] Field of Search ..................................... 264/478, 241, 264/259, 265, 271.1, 279, 328.1, 328.2, 328.3, 331.11, 331.12, 331.21; 192/70.11, 53.1; 29/527.1, 527.2; 156/182, 245

[56] References Cited

U.S. PATENT DOCUMENTS

| | | | |
|---|---|---|---|
| 3,927,241 | 12/1975 | Augustin | 428/408 |
| 4,116,921 | 9/1978 | Olivo et al. | 524/594 |
| 4,256,801 | 3/1981 | Chuluda | 442/322 |
| 4,487,862 | 12/1984 | Maruya | 523/506 |
| 4,597,484 | 7/1986 | Takiguchi et al. | 192/107 M |
| 5,408,736 | 4/1995 | Ammer et al. | 29/527.2 |

*Primary Examiner*—Jan H. Silbaugh
*Assistant Examiner*—Kenneth M. Jones
*Attorney, Agent, or Firm*—Kubovcik & Kubovcik

[57] ABSTRACT

A carbon-fiber-reinforced composite material is simply produced by molding a resin composition comprising carbon fibers and a matrix resin directly on a base material through injection molding or compression molding without resort to any primer.

5 Claims, No Drawings

PROCESS FOR PRODUCING CARBON-FIBER-REINFORCED COMPOSITE MATERIAL

BACKGROUND OF THE INVENTION

1. Field of the Invention

This invention relates to a process for producing a carbon-fiber-reinforced composite material which comprises a molding a resin composition directly on a base material without using any primer. More particularly, it relates to a process for producing a carbon-fiber-reinforced composite material suitable for use as a heat-resistant structural material, a sliding material, a wet or dry friction material or the like such as the sliding part of an automotive synchronizer ring or a wet friction material for automatics.

2. Prior Art

The major prior art for bonding a fiber-reinforced composite material to various materials has been to mold a fiber-reinforced composite material beforehand and bond the composite material to various materials through a primer (adhesive layer or stress-relaxing layer) which is usually the same kind of resin as the composite material comprises. Such prior art is disclosed in patent documents including Japanese Pat. Appln. Laid-Open Gazettes Nos. Sho 51-125133 (125133/76), Hei 1-149877 (149877/89), and Hei 1-279987 (279987/89).

However, the above method necessitates applying a drying a primer, resulting in an increased number of steps and lengthened time for production.

SUMMARY OF THE INVENTION

An object of this invention is to provide a simplified and shortened-time process for producing a carbon-fiber-reinforced composite material without particularly requiring an adhesive or stress-relaxing layer.

More specifically, this invention relates to a process for producing a carbon-fiber-reinforced composite material which comprises molding a resin composition comprising both carbon fibers and a matrix resin directly on a base material by injection molding or compression molding without resort to any primer.

The carbon fibers used in this invention are any of those selected among pitch-based carbon fibers, PAN-based carbon fibers, rayon-based carbon fibers and the like. However, pitch-based carbon fibers are preferred because a composite material containing the same gives a molding having excellent adhesion to the base material.

The carbon fibers used in this invention are in the form of continuous fibers, short or staple fibers, whiskers or the like. For use in injection molding, short fibers having a length of usually 1 to 10 mm, preferably 3 to 8 mm, are used.

The carbon fibers for use in this invention can be physically or chemically treated in order to improve the strength of adhesion thereof to the resin and the base material. The physical or chemical treatments include surface treatments and splitting such as electrolytic oxidation, corona treatment, application of a sizing agent and ultrasonic irradiation.

The coefficient of thermal expansion of the carbon fibers for use in this invention is usually $-0.2\times10^{-5}$ to $0$/K, preferably $-0.2\times10^{-5}$ to $-0.12\times10^{-5}$/K, most preferably $-0.17\times10^{-5}$ to $-0.14\times10^{-5}$/K.

The modulus of elasticity of the carbon fibers for use in this invention is usually 10 to 1,000 GPa, preferably 200 to 900 GPa, more preferably 400 to 800 GPa.

The thermal conductivity of the carbon fibers for use in this invention is usually 10 to 800 W/m·K, preferably 30 to 600 W/m·K.

The content of carbon fibers in a carbon fiber/resin molding is usually 1 to 90 vol %, preferably 10 to 70 vol %, more preferably 20 to 60 vol %, of the whole volume of the molding.

The matrix resin used in this invention can be heat-resistant resin, desirably thermosetting resin, more desirably phenolic or epoxy resin or the like.

The matrix resin after being cured has a coefficient of thermal expansion of usually $1\times10^{-5}$ to $10\times10^{-5}$/K, preferably $1\times10^{-5}$ to $5\times10^{-5}$/K.

The resin composition used in this invention can contain, besides the carbon fibers and matrix resin described above, friction modifiers, inorganic additives and fibers other than carbon fibers.

The friction modifiers include metal powders, rubber powders, cashew dust and graphite powders. The content of the friction modifier in the resin composition is usually 0.1 to 5 parts by weight per 100 parts by weight of the sum of the carbon fibers and matrix resin comprised in the composition.

The inorganic additives include silica, talc, calcium carbonate, magnesium oxide, kaolin, barium sulfate, potassium phosphate and diatomaceous earth. The content of the inorganic additive in the resin composition is usually 0.1 to 5 parts by weight per 100 parts by weight of the sum of the carbon fibers and matrix resin comprised in the composition.

The fibers other than carbon fibers may be organic or inorganic fibers and preferably include polyamide fibers, polyester fibers, acrylic fibers, glass fibers, alumina fibers, metal fibers and silicon carbide fibers. The content of said other fibers in the resin composition is usually 0.1 to 50 parts by weight per 100 parts by weight of the sum of the carbon fibers and matrix resin comprised in the composition.

The base material used in this invention is usually ceramics or metal which includes cast iron, carbon steel, stainless steel, nickel steel, chromium-molybdenum steel, chromium steel, super alloys, aluminum alloys, copper alloys, magnesium alloys, nickel alloys, zinc alloys, titanium alloys and super hard alloys. The base material may have a platy, cylindrical or more complicated shape according to the use of the final product.

The base material may have a coefficient of thermal expansion of $0.9\times10^{-5}$ to $4\times10^{-5}$/K.

The difference in the coefficient of thermal expansion between the carbon fiber/resin molding and the base material is usually 0 to $5\times10^{-6}$/K, preferably 0 to $2\times10^{-6}$/K.

The surface of the base material can be subjected to various treatments such as grooving or grinding for enhancing surface roughness, and is thereby improved in adhesion to the carbon fiber/resin molding.

The injection molding or compression molding can be conducted by ordinary methods and particular examples thereof will now be described.

In the case of injection molding, a mold is used which has the same shape therein as the desired shape of final product. The mold has a space in which a metallic material serving as an adherend (base material) is to be disposed and a space into which a feedstock for a carbon-fiber-reinforced plastic (CFRP) is to be injected. The mold further has a hole for injecting the CFRP feedstock therethrough into the mold and an opening for releasing therefrom the gas generated during CFRP molding. A metallic material is disposed in the mold and a CFRP feedstock is injected thereinto to mold a CFRP on the metallic material. The inner surface of the mold should be plated or otherwise treated to enhance the surface in smoothness so that the CFRP does not adhere to any material other than the metallic material. The mold temperature is usually 140 to 250° C., preferably 150 to 200° C. The pressure for feedstock extrusion is usually 50 to 180 kgf/cm$^2$, preferably 90 to 160 kgf/cm$^2$.

In the case of compression molding, the feedstock is dispersed on a metallic material and then pressed uniaxially under heating to give the intended molding. The mold temperature is usually 140 to 250° C., preferably 150 to 200° C. The pressure for the pressing is usually 50 to 180 kgf/cm$^2$, preferably 90 to 160 kgf/cm$^2$.

The process of this invention is applicable to the production of, e.g., synchronizer rings. In this application, a CFRP feedstock is directly injected onto a synchronizer to mold a CFRP, whereby the production process can be simplified and the production cost and time can be reduced.

DESCRIPTION OF THE PREFERRED EMBODIMENTS

This invention will new be described with reference to Examples, which should not be construed as limiting the scope of the invention.

EXAMPLE 1

40 vol % pitch-based short carbon fibers having a coefficient of thermal expansion of $-1.4 \times 10^{-6}$/K, a thermal conductivity of 100 W/m·K, a modulus of elasticity of 390 GPa and a length of 5 mm were mixed with 60 vol % phenolic resin having a coefficient of thermal expansion of $2.2 \times 10^{-5}$/K after curing. The resultant carbon fiber/resin mixture was injection-molded and bonded to the surface of a metallic material having a coefficient of thermal expansion of $1.2 \times 10^{-5}$/K. The two bonded parts could not be easily peeled from each other with a scraper.

COMPARATIVE EXAMPLE 1

40 vol % glass fibers having a coefficient of thermal expansion of $5.0 \times 10^{-6}$/K, a thermal conductivity of 1 W/m·K, a modulus of elasticity of 74 GPa and a length of 4 mm were mixed with 60 vol % phenolic resin having a coefficient of thermal expansion of $2.2 \times 10^{-5}$/K after curing. The resultant glass fiber/resin mixture was injection-molded and bonded to the surface of a metallic material having a coefficient of thermal expansion of $1.2 \times 10^{-5}$/K. The thus obtained glass fiber/resin molding and metallic material was observed to have a gap therebetween and could be easily peeled from each other with a scraper.

EXAMPLE 2

40 vol % pitch-based short carbon fibers having a coefficient of thermal expansion of $-1.44 \times 10^{-6}$/K, a thermal conductivity of 170 W/m·K, a modulus of elasticity of 490 GPa and a length of 6 mm were mixed with 60 vol % phenolic resin having a coefficient of thermal expansion of $2.2 \times 10^{-5}$/K after curing. The resultant carbon fiber/resin mixture was injection-molded and bonded to the surface of a metallic material having a coefficient of thermal expansion of $1.2 \times 10^{-5}$/K. The two bonded parts could not be easily peeled from each other with a scraper.

According to this invention, a resin composition comprising carbon fibers and a matrix resin is directly molded, without resort to any primer, on base materials such as a metallic material by injection molding or compression molding, thereby having made it possible to simplify the production process, shorten the production time and improve the adhesion between the resultant carbon fiber/resin molding and metallic material. This invention can therefore provide a process for producing a composite material which can be stably used without undergoing peeling of the molding from the base material even when it is used as a friction material or the like on which stress is imposed at high temperatures in a direction parallel to the bonded surface between the molding and the base material.

It has conventionally taken about 15 to 30 minutes to injection mold a fiber-reinforced composite material on a base material, that is, the conventional process involves the steps of spreading a primer such as phenolic or epoxy resin on the base material, drying the spread primer coat and then injection molding the composite material onto the dried primer coat. The process for injection molding according to the present invention, on the other hand, only takes about 0.5 to 1 minute since there is no need to apply and dry a primer.

What is claimed is:

1. A process for producing a sliding part of an automotive synchronizer ring or a wet friction material for automatics without resort to any primer comprising:

providing a resin composition to be injection molded wherein said resin composition comprises pitch- or PAN-based carbon fibers having a length of 1 to 10 mm and a phenolic or epoxy matrix resin wherein said carbon fibers are provided in an amount ranging from 20 to 60 vol % of the whole volume of the composition, providing a base material wherein a surface of the base material is grooved or ground before the surface is bonded to said resin composition and wherein said base material has a coefficient of thermal expansion of $0.9 \times 10^{-5}$ to $4 \times 10^{-5}$/K, injection molding, curing and bonding said resin composition directly to said base material to form said sliding part of an automotive synchronizer ring or said wet friction material for automatics, wherein said cured matrix resin has a coefficient of thermal expansion of $1 \times 10^{-5}$ to $10 \times 10^{-5}$/K and wherein the cured molded resin composition and the base material have a difference in coefficient of thermal expansion of 0 to $5 \times 10^{-6}$/K.

2. A process according to claim 1 wherein the carbon fibers are physically or chemically treated before mixed with the matrix resin, said treatment being selected from the group consisting of electrolytic oxidation, corona treatment, application of a sizing agent and ultrasonic irradiation.

3. A process according to claim 1 wherein the carbon fibers have a coefficient of thermal expansion of $-0.2 \times 10^{-5}$ to 0/K.

4. A process according to claim 1 wherein the carbon fibers have a modulus of elasticity of 10 to 1,000 GPa.

5. A process according to claim 1 wherein the carbon fibers have a thermal conductivity of 10 to 800 W/m·K.

* * * * *